(12) United States Patent
Kato et al.

(10) Patent No.: US 6,390,583 B1
(45) Date of Patent: May 21, 2002

(54) INFORMATION PROCESSING APPARATUS, PRINTING APPARATUS, INFORMATION PROCESSING METHOD AND PRINTING METHOD

(75) Inventors: Minako Kato; Kentaro Yano, both of Yokohama; Daigoro Kanematsu; Masao Kato, both of Kawasaki; Mitsuhiro Ono, Yokohama, all of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/549,719

(22) Filed: Apr. 14, 2000

(30) Foreign Application Priority Data

Apr. 19, 1999 (JP) .......................................... 11-111500

(51) Int. Cl.⁷ .............................................. B41J 2/205
(52) U.S. Cl. ............................ 347/15; 347/19; 358/406
(58) Field of Search ..................... 347/15, 19; 358/504, 358/406

(56) References Cited

U.S. PATENT DOCUMENTS

| | | | |
|---|---|---|---|
| 4,313,124 A | 1/1982 | Hara | 347/57 |
| 4,345,262 A | 8/1982 | Shirato et al. | 347/10 |
| 4,459,600 A | 7/1984 | Sato et al. | 347/47 |
| 4,463,359 A | 7/1984 | Ayata et al. | 347/56 |
| 4,558,333 A | 12/1985 | Sugitani et al. | 347/65 |
| 4,608,577 A | 8/1986 | Hori | 347/66 |
| 4,723,129 A | 2/1988 | Endo et al. | 347/56 |
| 4,740,796 A | 4/1988 | Endo et al. | 347/56 |
| 5,528,270 A | 6/1996 | Tajika et al. | 347/19 |
| 6,126,264 A * | 10/2000 | Suzuki et al. | 347/19 |
| 6,179,402 B1 * | 1/2001 | Suzuki et al. | 347/19 |

FOREIGN PATENT DOCUMENTS

| | | |
|---|---|---|
| JP | 54-056847 | 5/1979 |
| JP | 59-123670 | 7/1984 |
| JP | 59-138461 | 8/1984 |
| JP | 60-071260 | 4/1985 |
| JP | 2661917 | 6/1997 |

* cited by examiner

Primary Examiner—Craig A. Hallacher
(74) Attorney, Agent, or Firm—Fitzpatrick, Cella, Harper & Scinto

(57) ABSTRACT

An information processing apparatus, a printing apparatus, an information processing method and a printing method can print high quality images without lowering throughput by correcting density variations to within a range where they can hardly be perceived by the human eye as stripes or unevenness. With this invention, a print head having a plurality of nozzles capable of ejecting ink is used to print a test pattern based on image data with a predetermined gradation level. Then, based on read data of the test pattern, a temporary correction value α'[N] is calculated which will made the print density of rasters corresponding to each of the plurality of nozzles constant. The temporary correction value α40[N] is limited by the upper limit αU and the lower limit αL so that it is limited to within a range between αU and αL.

25 Claims, 12 Drawing Sheets

INFORMATION PROCESSING APPARATUS, PRINTING APPARATUS, INFORMATION PROCESSING METHOD AND PRINTING METHOD

This application is based on Patent Application No. 11-111500 (1999) filed Apr. 19, 1999 in Japan, the content of which is incorporated hereinto by reference.

BACKGROUND OF THE INVENTION

1. Field of the Invention

The present invention relates to an information processing apparatus, a printing apparatus, an information processing method and a printing method for correcting density variations of an image. The present invention can use a variety of types of print heads, each having a plurality of print elements, for printing an image. Particularly the present invention can suitably use an ink jet print head having an array of ink ejection nozzles and a heat transfer print head having an array of heat generating elements.

2. Description of the Prior Art

Currently known printing systems include a heat transfer printing system that transfers ink of an ink ribbon onto a printing medium such as paper by thermal energy, and an ink jet printing system that ejects ink droplets to adhere them to a printing medium such as paper.

Of these printing systems, the ink jet printing system has been widely used, as in printers and copying machines, because of low noise, low running cost, and an ease with which to reduce size and realize color printing. The printing apparatus using such an ink jet printing system generally employs print heads with a dense array of print elements to enhance the printing speed. The print elements include, for example, ink ejection nozzles or orifices.

A serial scan printing method of the ink jet printing apparatus that scans the print head in a main scan direction produces lines of varying densities extending along the main scan direction (also referred to as striped density variations or banding). This is considered one of the causes for image quality degradation. The striped density variations often appear periodically in the sub scan direction and show conspicuously. In a so-called multi-nozzle type print head having a plurality of ink ejection nozzles, when thermal energy of a heater (electrothermal transducer) provided in an ink passage communicating with each nozzle is used to eject an ink droplet, for example, the striped variations are caused by the following factors. One of the factors is variations among nozzles in the amount of ink ejected and in the ejection direction, which are caused by variations among nozzles in the size of heaters and nozzles produced during the manufacture. Another factor is discrepancies between a printing medium feed and a printing width that occur in the serial scan printing method. Still another factor is ink density variations and ink displacements on the printing medium caused by printing time variations.

A variety of methods for eliminating such density variations to enhance print quality have been proposed.

One such method is a dividing printing method (multipass printing method) that completes printing of one area on a printing medium by a plurality of scans of the print head. This dividing printing method is effective in eliminating the striped density variations. However, to produce a satisfactory effect this method needs to increase the number of print head scans for each printing area, i.e., increase the number of divisions. This reduces the area that is printed in each scan of the print head, lowering the throughput.

Another method of suppressing the striped density variations without using the dividing printing method, for example, a head shading method, is disclosed in U.S. Pat. No. 5,528,270. This method is implemented in a sequence of steps shown in First, a preset test pattern for determining a correction value is printed on a printing medium by using a print head (step S11), and the density of the printed test pattern is read by a scanner (step S12). After the position of the read image is properly corrected, the density of the image is averaged in the direction of column (main scan direction) (step S13) and then allocated to a raster of the associated nozzle of the print head (step S14). Density variations are caused by variations among nozzles in the ejected ink amount and the ink ejection direction or by the spreading or wicking of ink on the printing medium. The next step S15 determines a density correction value for each nozzle from the density data allocated to each raster at step S14.

Based on the correction values, the image data for each nozzle is corrected (step S16). In more specific terms, a γ table for each nozzle is changed, or a drive table for each nozzle is changed, to adjust the density of the image to be printed. The image data is corrected based on the correction values so that a raster, which prints darker than normal when no correction is made, will print lighter and that a rater, which prints lighter than normal when no correction is made, will print darker, thereby reducing the density variations. A correction method that changes the density of the original image data by changing the output γ table for each nozzle in particular is very effective for the correction of density variations. Further, U.S. Pat. No. 5,528,270 describes a method of printing an image without producing unwanted stripes or density variations in the whole gradation range by taking an input gradation into account and by not performing correction for low-density printing areas but performing correction for high-density printing areas.

However, when the correction of the original image data using the output γ table is performed by focusing only on averaging the print density for each raster, the following problems arise.

In a binary printing system, such as an ink jet printing system, each pixel can only be represented by the presence or absence of dots, so that a halftone is represented by changing the percentage of dots with respect to a predetermined printing area in a so-called area gradation method. In the area gradation method, the number of dots in a predetermined printing area is changed according to the print density. In a quantization method that mainly uses an error diffusion technique, as the number of dots changes, the spatial frequency characteristic, such as granularity of a printed image, also changes. In a printed image, when areas with different granularities adjoin, the granularity. difference will mar the evenness of image quality. Hence, even if the optical reflection density of the printed image is uniform, the spatial frequency difference is recognized by the human eye with the result that the image looks as though there are density variations.

This is explained in more detail by referring to FIGS. 11, 12 and 13. FIG. 11 is a front view of an ink jet print head 100, showing the front of the print head that faces the printing medium. For simplicity of explanation, the print head 100 is assumed to have six ink ejection nozzles, which are designated, from the first to sixth nozzle, as 101a, 101b, 101c, 101d, 101e and 101f. It is also assumed that the first to sixth nozzle have variations in the ink ejection amount but no variations in the ink ejection direction.

FIG. 12 is an explanatory diagram showing the dots formed on the printing medium by one scan operation of the print head 100. Dots formed by ink droplets ejected from the nozzles 110a, 101b, 101c, 101d, 101e, 110f are denoted 102a, 102b, 102c, 102d, 102e, 102f. In this example, as can be seen from FIG. 12, the ink ejection amount varies from one nozzle to another, with the amounts of ink ejected from the nozzles 101a, 101b, 101e being "medium", those from the nozzles 101c, 101d being "large", and that from the nozzle 101f being "small." Variations among the nozzles in the amount of ink ejected cause variations in raster density among the nozzles. That is, as shown in FIG. 12, the print densities of the rasters corresponding to the first, second and fifth nozzles 101a, 101b, 101e (referred to as "first raster", "second raster", and "fifth raster") are "medium", those of the rasters corresponding to the third and fourth nozzles 101c, 101d (referred to as "third raster" and "fourth raster") are "high", and that of the raster corresponding to the sixth nozzle 101f (referred to as "sixth raster") is "low".

According to such a density distribution, a density correction value for each raster is determined as shown in FIG. 12. This correction value represents the percentage by which the input gradation level is to be changed. First, for the first and second rasters, because they have medium densities, their correction values are set to 1.0, i.e., no correction is made. Next, for the third and fourth rasters, their densities are high, so that their correction values are set to 0.5. This value of 0.5 means that the print density is reduced by lowering the input gradation level by 50% from the level with no correction. Further, for the fifth raster, no correction is made as with the first and second rasters. For the sixth raster, because its density is low, the correction value is set to 1.5. The correction value of 1.5 means that the input gradation level is increased by 50% from the level with no correction. In this way, for the rasters that print darker than normal, the correction is made such that the input gradation level as the original data is reduced. Conversely, for the rasters that print lighter than normal, the input gradation level as the original data is increased. With this correction, the print densities of the rasters are equalized.

FIG. 13 shows the dots formed on the printing medium as a result of the corrections made. For the third and fourth rasters with the correction value of 0.5, the number of dots is halved; and for the sixth raster with the correction value of 1.5, the number of dots is increased by 1.5 times. As a result, the print densities become even as shown in FIG. 13, thus achieving the object of the correction.

However, even if the print densities are uniform as shown in FIG. 13, an area where many small dots are formed and an area where large dots are sparsely formed look different to the human eye, as shown to the left in FIG. 13. This is because their spatial frequency distributions are different. When areas with different spatial frequency distributions adjoin, the density unevenness is conspicuous at the boundary of these areas. That is, these two areas, though they have equal densities, appear unequal to the human eye.

SUMMARY OF THE INVENTION

The object of the present invention is to solve such a problem and provides an information processing apparatus, a printing apparatus, an information processing method and a printing method that can print high quality images without lowering throughput by correcting density variations to a level where they can hardly be perceived by human eye as stripes or unevenness.

In a first aspect of the present invention, there is provided an information processing apparatus for correcting image data to be input to a printing apparatus, the printing apparatus being capable of printing an image on a printing medium, the information processing apparatus comprising:

a correction value calculation means to calculate a correction value for correcting density variations of the image printed on the printing medium;

a limiting means to limit the correction value to within a predetermined range; and a correction means to correct the image data based on the correction value limited by the limiting means.

In a second aspect of the present invention, there is provided a printing apparatus capable of printing an image on a printing medium according to image data, the printing apparatus comprising:

a correction value calculation means to calculate a correction value for; correcting density variations of the image printed on the printing medium;

a limiting means to limit the correction value to within a predetermined range; and a correction means to correct the image data based on the correction value limited by the limiting means.

In a third aspect of the present invention, there is provided an information processing method for correcting image data to be input to a printing apparatus, the printing apparatus being capable of printing an image on a printing medium, the information processing method comprising the steps of:

calculating a correction value for correcting density variations of the image printed on the printing medium;

limiting the correction value to within a predetermined range; and correcting the image data based on the limited correction value.

In a fourth aspect of the present invention, there is provided a method of printing an image on a printing medium based on image data, the method comprising the steps of:

calculating a correction value for correcting density variations of the image printed on the printing medium;

limiting the correction value to within a predetermined range; and correcting the image data based on the limited correction value.

This invention performs additional processing that limits the correction value for correcting the image density variations to a predetermined range. With this added processing, the invention can correct density variations to a level where they can hardly be recognized by human eye as stripes or unevenness, and thereby can print high quality images. For example, the correction value calculated from the standpoint of making the print density even is limited from the standpoint of making uniform the dot granularity associated with the pixel arrangement. This eliminates sharp changes in the granularity and ensures an image correction that makes stripes or unevenness not perceivable to human eye.

In a serial scan system that prints an image as the print head is scanned, this invention makes it unnecessary to employ the multipass printing method as a conventional method that scans the print head a plurality of times to print one printing area and thus causes a reduction in throughput. Hence, a high quality image with no density variations can be printed.

The above and other objects, effects, features and advantages of the present invention will become more apparent from the following description of embodiments thereof taken in conjunction with the accompanying drawings.

DESCRIPTION OF THE PREFERRED EMBODIMENTS

Embodiments of the present invention will be described by referring to the accompanying drawings.

First, a basic configuration of the printing apparatus that can apply the present invention will be explained.
(Basic Configuration)

Figure 1:
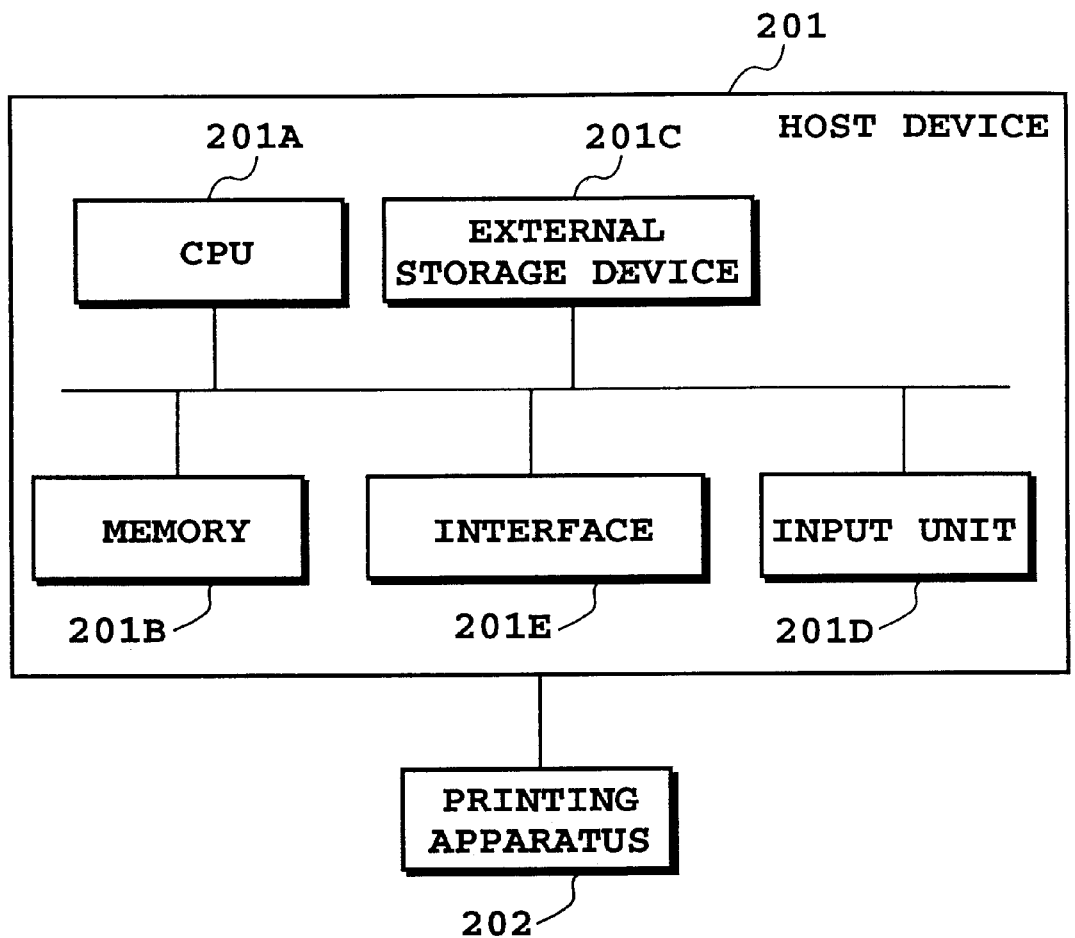
FIG. 1 is a block configuration diagram of an image processing system that can apply the present invention.

FIG. 1 shows an image processing system to which the present invention is applicable.

In FIG. 1, a host device 201 has a CPU 201A, a memory 201B, an external storage unit 201C, an input unit 201D, and an interface 201E with a printing apparatus 202. The CPU 201A executes programs stored in the memory 201B to perform color processing and quantization processing described later. These programs are read from the external storage unit 201C or supplied from an external device. The host device 201 is connected to the printing apparatus 202 via the interface 201E to send image data, that was color-processed, to the printing apparatus 202, which then prints an image based on the received image data.

Figure 2:
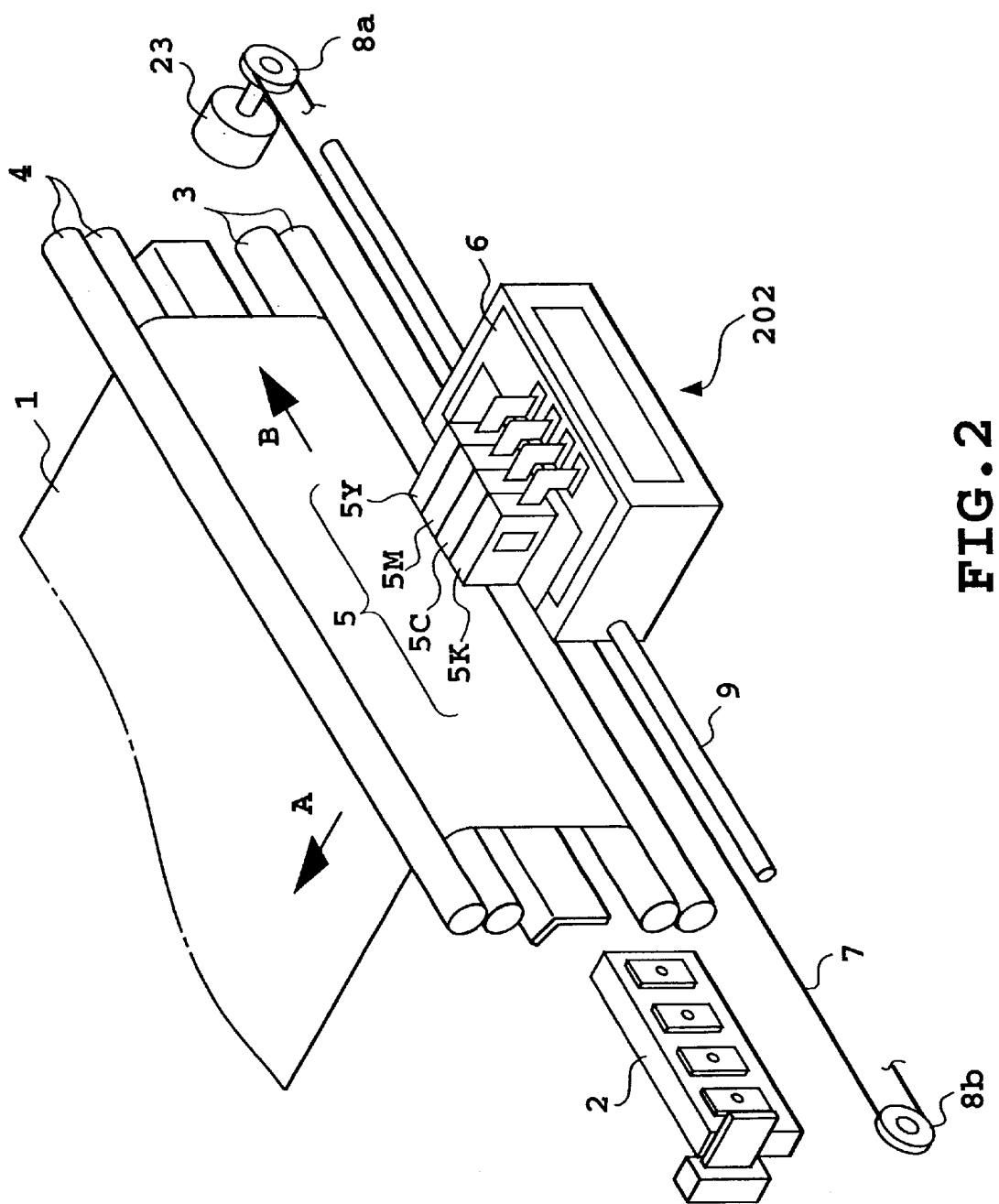
FIG. 2 is a schematic perspective view of a printing apparatus that can apply the present invention.

FIG. 2 is a perspective view showing essential parts of one example configuration of the printing apparatus 202. This printing apparatus 202 is shown as an example of an ink jet printing apparatus.

In FIG. 2, reference number 1 represents a printing sheet as a printing medium, such as paper or plastic film, a plurality of which are stacked in a cassette and fed one piece at a time by paper feed rollers (not shown). The printing sheet 1 thus fed is carried in the direction of arrow A by a first transport roller pair 3 and a second transport roller pair 4. The transport roller pairs 3, 4 are driven by their associated stepping motors (not shown). Denoted by 5 is an ink jet print head. In this example, to make a color image, the print head 5 includes a print head 5K for ejecting black ink (K), a print head 5C for ejecting cyan ink (C), a print head 5M for ejecting magenta ink (M), and a print head 5Y for ejecting yellow ink (Y). These print heads 5K, 5C, 5M, 5Y are also referred to simply as the print head 5. The print head 5 ejects ink supplied from an ink cartridge (not shown) from ink ejection nozzles according to image signals. The print head 5 and the ink cartridge are mounted on a carriage 6, which is secured to a belt 7 wound between pulleys 8a, 8b. The pulley 8a is connected to a carriage motor 23 that drives the carriage 6 to reciprocate in the main scan direction along a guide shaft 9.

An image is printed as follows. As the print head 5 together with the carriage 6 performs the main scan in the direction of arrow B, it ejects ink from its ink ejection nozzles to print one line of an image on the printing sheet 1. Then, the printing sheet 1 is fed a distance equal to the width of the printed line in the direction of arrow A by the transport roller pairs 3, 4. By repeating the main scan of the print head 5 and the feeding of the printing sheet 1, lines making up the whole image are successively printed on the printing sheet 1 one line at a time. The print head 5 is returned to a home position, as required, where its nozzles are cleared of clogging materials by an ink ejection recovery device 2. The carriage 6 also carries a scanner (not shown) as a reading means for reading the test pattern printed on the printing sheet 1.

Figure 3:
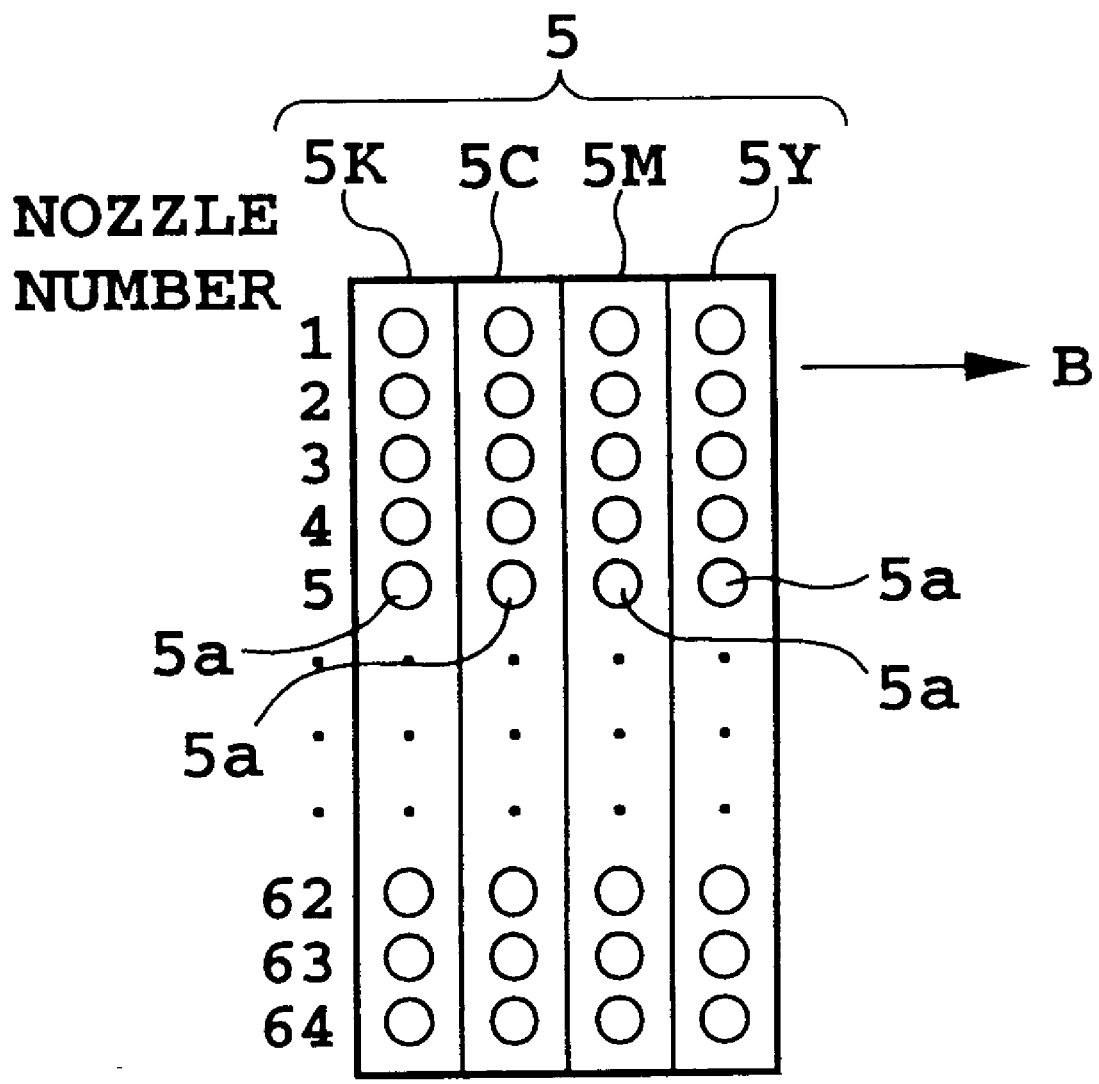
FIG. 3 is a schematic front view of a print head in the printing apparatus of FIG. 2.

FIG. 3 is a front view showing the front face of the print head, 5 squarely facing the printing sheet 1. In this example, the print heads 5K, 5C, 5M, 5Y are arranged so that their 64 nozzles each are lined in a direction perpendicular to the direction of arrow B. 5a denotes an ink ejection opening of each nozzle. The print head 5 in this example has heaters (electrothermal transducers) installed one in each ink passage associated with the ink ejection opening 5a. The heater is activated to produce heat to generate a bubble in ink in each ink passage, thereby ejecting an ink droplet from the ink ejection opening 5a.

Figure 4:
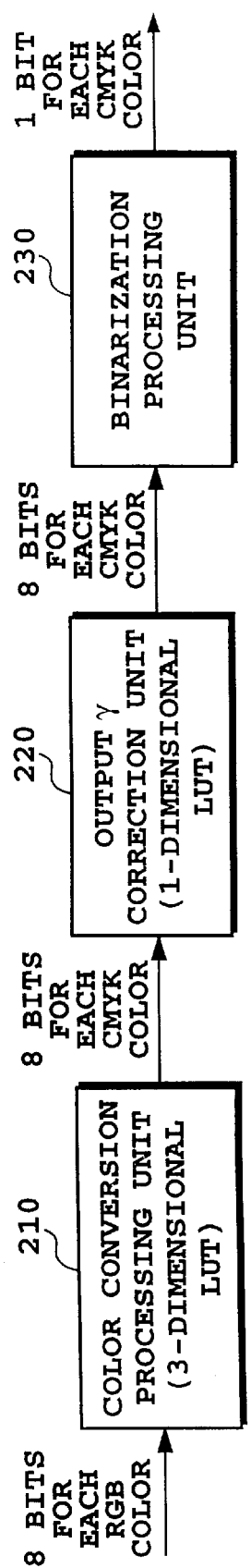
FIG. 4 is a block configuration diagram of an image processing unit in the printing apparatus of FIG. 2.

FIG. 4 is a configuration block diagram showing how the image data to be supplied to the printing apparatus 202 is generated by the host device 201. In this example, 8-bit image data for each R, G, B color, i.e., 256-gradation image data for each of C (cyan), M (magenta), Y (yellow) and K (black) inks, is output.

The 8-bit image data for each R, G, B color is converted into 8-bit data for each C, M, Y, K ink by a three-dimensional lookup table (LUT) which acts as a color conversion processing unit 210. This is color conversion processing that converts an RGB color from an input system into a CMYK color of an output system. The input data from the input system is often three primary colors (RGB) of additive color mixing in a light emitting body such as a display. In an output system such as a printer, when a color is produced by reflection of light, Color materials of three primary colors (CMY) of subtractive color mixing are used. Hence, the above color conversion processing is required. The three-dimensional LUT used in the color conversion processing holds discrete data, so data intermediate between those available data is determined by interpolation processing. The interpolation processing is a known technique and thus is not described here.

The 8-bit data for each C, M, Y, K ink that has been color-converted is then subjected to an output γ correction by a one-dimensional lookup table (LUT) that works as an output γ correction unit 220. The relation between the number of dots per unit area on the printing medium and the output characteristic such as reflection density is in most cases not linear. The output γ correction is therefore performed to guarantee that the relationship between the 8-bit input level for each C, M, Y, K ink color and the output characteristic of each C, M, Y, K ink is linear. The one-dimensional LUTs as the output γ correction tables are provided in numbers corresponding to all nozzles in each of the print heads 5K, 5C, 5M, 5Y and are changed by the density variation correction values described later. In this way, the 8-bit input data for each RGB color is converted into 8-bit data of each C, M, Y, K ink color in the printing apparatus 202.

The printing apparatus 202 in this example is a binary printing apparatus that prints an image by either ejecting or not ejecting ink. Hence, the 8-bit data for each C, M, Y, K ink color is quantized into 1-bit data for each C, M, Y, K ink color by a binary processing unit 230. The quantization may use a known error diffusion method or dithering method.

Next, examples of density variation correction will be described.

(First Embodiment of Density Variation Correction)

In this example, the density variation is corrected from the standpoint of both the print density and the dot distribution.

Figure 5:
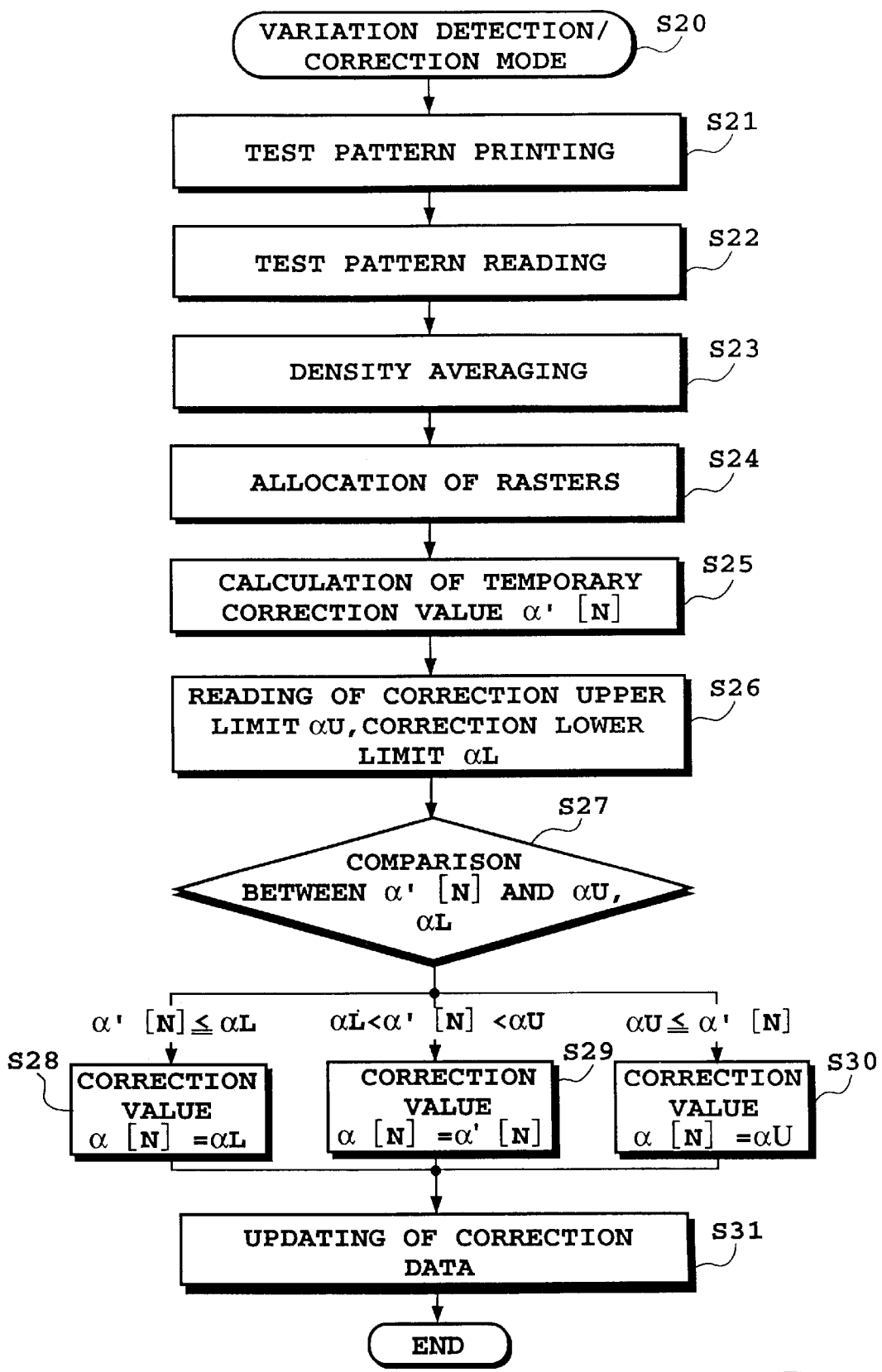
FIG. 5 is a flow chart showing a correction value determination process in a first embodiment of the present invention.

FIG. 5 is a flow chart showing the density variation correction method of this embodiment. First, when the user selects a density variation correction mode on a UI (user interface) screen in the printer driver (not shown), the selected mode is activated (step 820). Then, a preset test pattern is printed on the printing sheet 1 by the printing apparatus 202 (step S821). This test-pattern is for detecting the printing variation correction values and is printed in a normal print mode, i.e., with the printing sheet feed distance and the print head drive parameter set to the same values as in the normal print mode. In this example, the process of this correction method will be explained in view of a one-pass printing method in which all dots are printed in one scan of the print head. In this case, the feed distance of the printing sheet is equal to the 64 rasters, which is the same as the number of the nozzles. Then, the printed test pattern is read by the scanner, not shown, mounted on the carriage 6 in the printing apparatus 202 (step S22).

Figure 6:
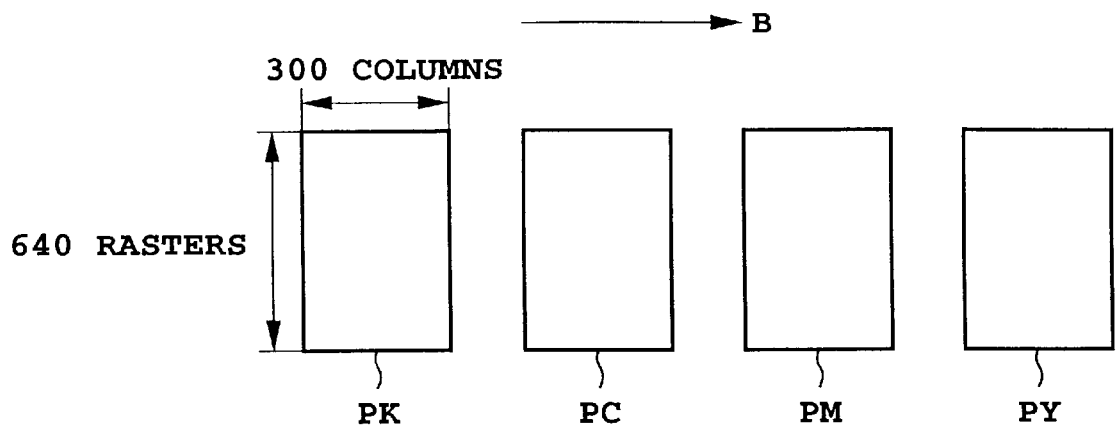
FIG. 6 is an explanatory view of a test pattern in the first embodiment of the invention.

FIG. 6 is an explanatory diagram showing one example of the test pattern. In this example, the print heads 5K, 5C, 5M, 5Y print patterns PK, PC, PM, PY with constant, uniform input gradation levels G. The "input gradation level" is an 8-bit gradation level of each C, M, Y, K ink color after being subjected to color conversion by the color conversion processing unit 210 of FIG. 4. When the test pattern is printed at a low density, the density variation is not easily perceived because the number of dots is small. Conversely, when it is printed at a high density, the density variation is similarly difficult to recognize because the dot overlapping is large. Therefore, the input gradation level is set so that the print densities of the test patterns PK, PC, PM, PY will be halftone at which the density variation is most easily recognized. For example, the input gradation level G of each of the test patterns PK, PC, PM, PY may be set at around level 100 in a gradation range of 255.

Further, in this example, the test patterns PK, PC, PM, PY each has 300 columns arranged in the horizontal direction (main scan direction) and 640 rasters arranged in the vertical direction (sub scan direction) and are shaped patches lined horizontally at predetermined intervals. Because the vertical width of a printing image printed by a single carriage scan is 64 rasters, the print head 5 needs to be scanned 10 times to print the test patterns PK, PC, PM, PY each measuring 640 rasters in the vertical direction.

The size of the patchlike test patterns PK, PC, PM, PY is not limited to this size and can be set to an optimum size considering the scan error of the carriage 6, feed error of the printing sheet 1 and ink ejection stability of the print head 5. The reading of the test patterns PK, PC, PM, PY is not limited to the method using the scanner in the printing apparatus 202 but may use a density sensor installed in the printing apparatus 202 or a scanner separated from the printing apparatus 202.

Next, the image read from the printed patterns PK, PC, PM, PY is adjusted in position, such as inclination, and the density of the image is averaged (step S23). First, the print density of each of the 640 rasters is averaged in the horizontal direction. That is, for each raster, the print densities of 300 columns are averaged. Then, the print densities of those rasters which are associated with each nozzle are averaged. In this example, the same nozzle is used every 64 rasters and thus the print density of the same nozzle appears ten times (which is equal to ten scans) at 64-raster intervals. Hence, the print densities of those rasters printed by 10 scans which correspond to each of the 64 nozzles are averaged. The reason for averaging the print densities in this way is to eliminate influences of the ink ejection stability errors of the print head 5, the mechanical operation errors of the carriage moving mechanism and printing sheet feeding mechanism, the reading errors of the scanner and the distortions of the printing sheet 1 caused by absorption of water. Let OD[N] stand for the averaged print density of 10 rasters that correspond to each of the 64 nozzles (nozzle number N=1 to 64). The matching between the print densities and the rasters is referred to as a raster allocation (step S24). Next, at step S25, a temporary correction value α'[N] for density is calculated from the averaged print density OD[N] of rasters corresponding to each nozzle. The method for this calculation will be described later. Next, a preset upper limit αU and a preset lower limit αL for density correction are read in (step S26) and compared with the temporary correction value α'[N] (step S27). According to the result of comparison, a normal correction value α[N] is determined. That is, when α'[N]≦αL, then α[N]=αL (step S28); when αL<α'[N]<αU, then α[N]=α'[N] (step S29); and when αU≦α'[N], then α[N]=αU (step S30).

Next, according to the correction value α[N] thus determined, an output γ table γ[N] for each nozzle is updated (step S31). The updating of the γ table is done for each nozzle of each of the print heads 5K, 5C, 5M, 5Y. The updating of the γ table may be done by changing address information of a table to be used. In a system that uses the output γ table by copying an active output γ table to a predetermined memory area, the output γ table may be updated by copying the newly selected output γ table to that memory area. There is no limitation as to the way the output γ table is updated.

Figure 7:
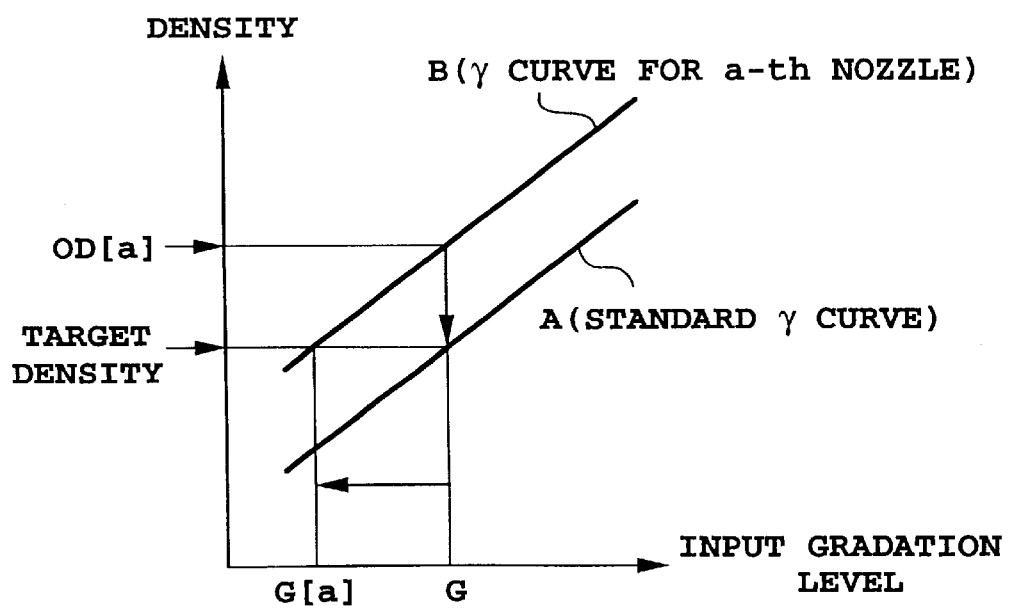
FIG. 7 is a correlation diagram between an input gradation and a density which explains the correction value determination process of the first embodiment of the invention.

FIG. 7 shows the method of determining the temporary correction value α'[N]. First, a standard γ curve A is set. The γ curve A may be one corresponding to the vicinity of the average of the image density printed by the printing apparatus 202. The γ curve is assumed to be linear in a narrow range of about 30–40 gradation level. From the standard γ curve A, the print density for the input gradation level of G, i.e., the print density when the input gradation level is that of the test pattern, is determined. This is treated as a target density.

The process of determining the temporary correction value α'[N] will be explained in a representative case where the temporary correction value α'[a] for an a-th nozzle is to be determined. As described above, from the test pattern read data, an averaged print density OD[a] for the rasters associated with the a-th nozzle is determined. If the density OD[a] is not equal to the target density, this means that a γ curve B of the a-th nozzle is not identical to the standard γ curve A, as shown in FIG. 7. This discrepancy can be considered to be caused by a difference there is between the amount of ink applied from the a-th nozzle to its associated rasters and the amount of ink applied from other nozzles to their rasters. The variations among nozzles in the amount of ink applied are caused by differing amounts of ink ejected from the nozzles and variations of ejection directions. Thus, the γ curve B for the a-th nozzle can be considered to have the same rate of change as the standard γ curve A, though their absolute density values differ. Therefore, the γ curve B for the a-th nozzle can be determined by shifting the standard γ curve A, as shown in FIG. 7. From the γ curve B determined in this manner, an input gradation level G[a] can be determined which represents the input gradation level at which the a-th nozzle can produce the target density. This means that converting the original input gradation level G into G[a] causes the rasters corresponding to the a-th nozzle to have the target density. Thus, the temporary correction value α'[a] associated with the a-th nozzle can be determined by α'[a]=G[a]/G. The gradation level (correction gradation level) corrected by the temporary correction value α'[a], therefore, is given by (correction gradation level)=(input gradation level)×G[a]/G.

In this way, the correction gradation level is determined by calculation. It is also possible to determine the correction gradation level by using a table that converts the input gradation level G into G[a]. In addition to taking the print density as a reference as in this example, it is possible to use other characteristic quantities such as brightness as a reference in determining the correction gradation level.

Next, the method of determining the upper limit αU and the lower limit αL for correction will be explained.

The upper limit αU and lower limit αL for correction are determined by the evenness of dot arrangement. A quantity that is suited for representing the evenness of the dot arrangement is granularity. There are many granularity calculation methods available. In, this example, the following calculation method is adopted. First, a quantized image P is converted into a space of spatial frequency component by a Fourier transform. Then, the frequency components of the waveform are filtered to be weighted with a human visual characteristic. The visual characteristic is represented by the following equation (1) with f representing a spatial frequency (cycles/degree).

$$\text{Visual characteristic} = 5.05(e^{-0.138f})(1-e^{-0.1f}) \quad (1)$$

The visual characteristic filter is a low-pass filter that cuts off high frequency components. By applying the visual characteristic filter, a more realistic visual evaluation can be made. The waveform thus obtained is Fourier-transformed for re-conversion into a normal space and a newly obtained image is taken as P'. When the aperture size for density measurement used for calculating the granularity is set to one pixel, the granularity is given by the following expression (2).

$$\text{Granularity} = \left\{ \frac{1}{N} \sum_{i}^{N} (P'i - P'ave)^2 \right\}^{\frac{1}{2}} \quad (2)$$

Where P'i is a density of each pixel in the image P', P'ave is an average value of the density P'i, and N is the number of pixels.

This calculation is performed for each gradation level to determine the relationship between the input gradation level and the granularity. Because the image P is a quantized image, the granularity changes depending on the method of quantization. In a pattern which has many high frequency components that are cut off by the visual characteristic filter, the granularity is lowered.

The method of calculating the granularity is not limited to the one described above. For example, because a difference between two image areas, even with the same granularity variation, is more easily recognized when they are placed closer to each other, an already proposed method may be employed. One such example is a method that differentiates the spectrum of the image P' to extract only the components of sharp changes between the adjoining image areas. In this way, any granularity calculation method may be employed.

As described above, it is seen that the granularity changes according to an input value of the original image before quantization and that it also changes greatly depending on the quantization method and the resolution even when the original image has the same input value. Hence, the larger the density correction amount for a raster, the more greatly the input gradation level changes and so also the granularity. Therefore, when the density correction for a raster is increased, the uniformity with the nearby rasters is lost, resulting in this area showing like a stripe.

For this reason, when the temporary correction value α'[N], which is intended to equalize the density, becomes too large, there is a possibility that the evenness of image quality may be lost. Thus, as described above, the range of the correction value α[N] is limited by setting the upper limit αU to the maximum and the lower limit αL to the minimum. The upper limit αU and the lower limit αL are limit correction values for which recognizable stripes caused by the granularity changes do not show. In this example, the granularity change of ±10% is taken to be the one that will produce a recognizable stripe. The ±10% granularity change corresponds to about 20 gradation levels. In this example in which the correction value α[N] is determined by taking the input gradation level G as G=100, the 20 gradation levels correspond to 20% of the input gradation level, so that settings of αU=0.8 and αL=1.2 are used. As a result, the correction value α[N] is limited to the range of 0.8 to 1.2 in which the image is not affected by the granularity changes.

The granularity change that produces a recognizable stripe varies depending on the ink color and density. In the case of an ink with high brightness level, such as a yellow ink, because the dot arrangement is not easily identifiable, even a significant change in the granularity will not result in a recognizable stripe. Hence, the upper limit αU and the lower limit αL need to be set at appropriate values according to the ink color and density and resolution.

Figure 8A:
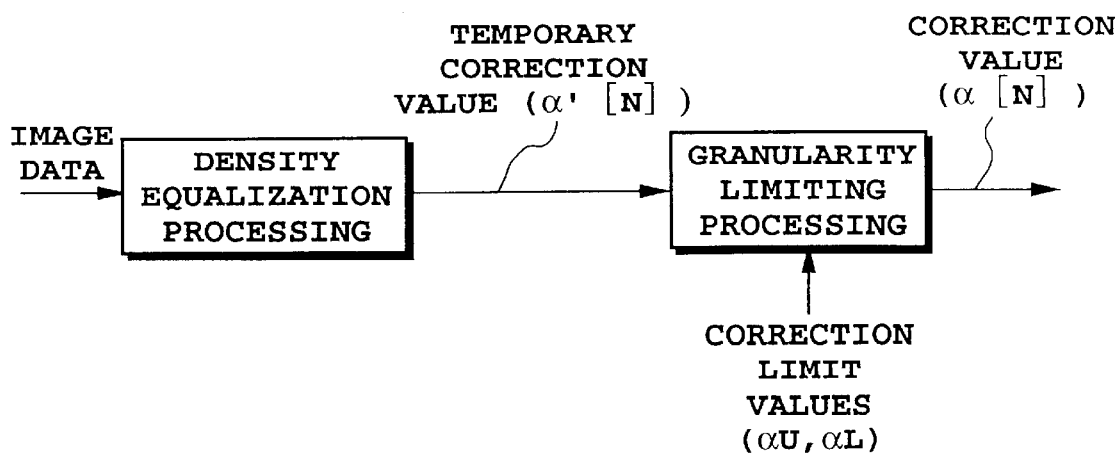
FIGS. 8A and 8B are explanatory diagrams showing other examples of the correction value determination process in the first embodiment of the invention.
Figure 8B:
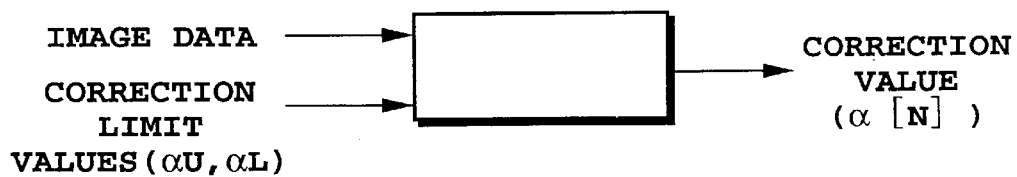
Figure 9A:
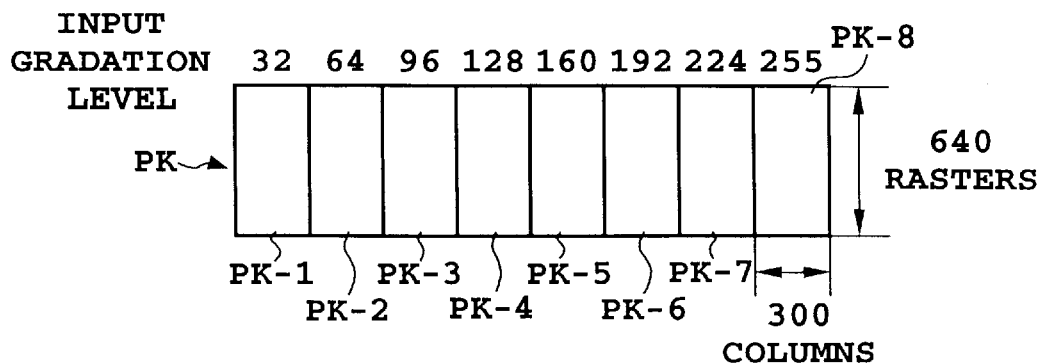
FIGS. 9A, 9B, 9C and 9D are explanatory views of test patterns in a second embodiment of the invention.
Figure 9B:
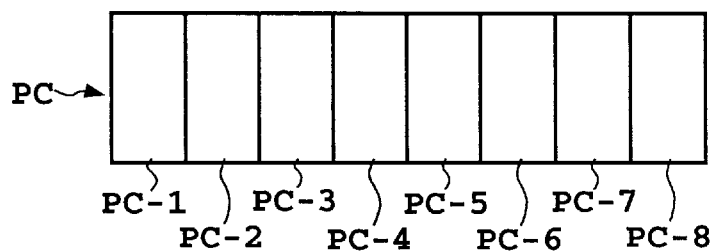
Figure 9C:
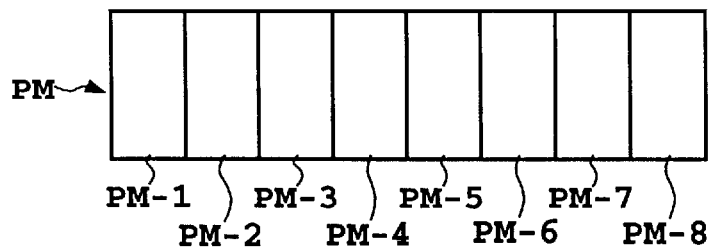
Figure 9D:
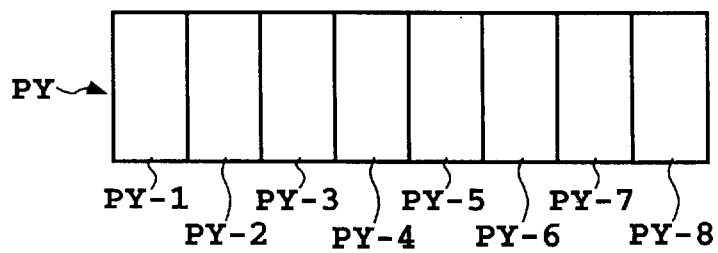

In this example, as shown in FIG. 8A, the 8-bit CMYK image data is taken as an input signal and undergoes two stages of processing to determine the correction value α[N]. That is, in order to equalize the print density, after the temporary correction value α'[N] has been determined, the temporary correction value α'[N] is limited by the correction limit values (αU, αL) to limit the granularity change for determining the correction value α[N]. However, as shown in FIG. 8B, the image data and the correction limit values (αU, αL) may be used as input data of a single process to determine a correction value α[N] that considers both the evenness of density and the evenness of granularity.

(Second Embodiment of Density Variation Correction)

In the first embodiment, a correction value is determined for one input gradation level (G=100) and the determined correction value is applied for all gradation levels (255 gradation levels). But, for the first and second reasons that follow, it is better, in order to obtain an appropriate correction value for all gradation levels, to use not just a test pattern with a single gradation level but test patterns with a plurality of gradation levels, i.e., to use a plurality of test patterns with differing print densities. The first reason for this is that, in a print area with high density, because the ink overlap is large, the print density does not change as much as in the low density print area for the same input gradation level changes. That is, in a high density print area with a high gradation level and in a low density print area with a low gradation level, the amounts of change in the input gradation level required to cause the same density changes (OD changes) differ. The second reason is that, the granularities in the high density print area with a high gradation level and in a low density print area with a low gradation level also differ.

In this embodiment, test patterns PK, PC, PM, PY corresponding to K, C, M and Y ink colors respectively are printed, as shown in FIGS. 9A, 9B, 9C and 9D, each test pattern consisting of eight uniform patterns or patches with different input gradation levels G. In the case of the test pattern PK, it has eight patches PK-1, PK-2, PK-3, PK-4, PK-5, PK-6, PK-7, PK-8 printed at eight different gradation levels that divide the 0–255 input gradation range into eight equal segments, i.e., at level 32, level 64, level 96, level 128, level 160, level 192, level 224 and level 255. The same printing arrangement also applies to other test patterns PC, PM, PY. The size of each patch is equal to the test pattern of the first embodiment.

In this embodiment, the test patterns with different densities are used and the processing of FIG. 5 is executed as in the first embodiment to determine the correction value α[N]. The target density (see FIG. 7) and the correction limit values (αU, αL) are determined in advance for each gradation level of the test pattern or patch in each ink color. Therefore, based on the correction value α[N] that has been determined for each of the eight gradation level print areas in the test pattern, an output γ table is determined for each of the eight gradation levels. The output γ tables obtained in this way are used for the corresponding input gradation levels of the image data. When the correction values for the adjoining print areas differ greatly, a sharp gradation change (or "jump") is likely to occur at the boundary portion between the adjoining areas. For the boundary portion, therefore, appropriate smoothing processing is performed to produce a smooth gradation.

(Another Embodiment)

The image data can be processed not only by the host device 201 (see FIG. 1), which functions as the information processing device, but also on the side of the printing apparatus 202. In that case, processing means, such as shown in FIGS. 8A and 8B, are provided in the printing apparatus 202.

(Other)

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof are disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using-the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated into the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laid-open Nos. 59-123670 (1984) and 59-138461 (1984) in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consist of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the. effect of the present invention more reliable. Examples of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably. In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through-holes formed in a porous sheet as liquid or solid substances so that the ink faces the electrothermal transducers as described in Japanese Patent Application Laid-open Nos. 54-56847 (1979) or 60-71260 (1985). The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention may be applied to a system consisting of a plurality of devices (such as a host computer, an interface device, a reader and a printer) or to single device (such as a copying machine or a facsimile apparatus).

The present invention also includes a configuration in which a computer in an apparatus or system, which is connected with a variety of devices so as to realize functions of the foregoing examples, is loaded with a program code of software and in which these devices are operated according to the program stored in the computer (CPU or MPU).

In this case, the, software program code itself realizes the functions of these examples. The program code and a means for loading the program code to the computer, such as a storage medium containing a program code, constitute the present invention. The storage media for storing the program code include floppy disk, hard disk, optical disk, magnetooptical disk, CD-ROM, magnetic tape, nonvolatile memory card and ROM.

The program code is included in the present invention not only when the functions of the aforementioned examples are realized by executing the program code loaded into the computer, but also when these functions are realized by the program code in cooperation with an OS (operating system) or application software running on the computer.

It is needless to say that the present invention further includes a configuration in which the program code is stored in a memory mounted on a computer's function extension board or a function extension unit connected to the computer and the CPU in the function extension board or unit executes a part or all of the actual processing according to the instructions of the program code to realize the functions of the preceding examples.

The present invention has been described in detail with respect to preferred embodiments, and it will now be apparent from the foregoing to those skilled in the art that changes and modifications may be made without departing from the invention in its broader aspects, and it is the intention, therefore, that the appended claims cover all such changes and modifications as fall within the true spirit of the invention.

What is claimed is:

1. An information processing apparatus for correcting image data to be input to a printing apparatus, the printing apparatus being capable of printing an image on a printing medium, the information processing apparatus comprising:
   correction value calculation means to calculate a correction value for correcting density variations of the image printed on the printing medium;
   limiting means to limit the correction value calculated by said correction value calculation means to within a range limited by a predetermined upper limit value and/or a predetermined lower limit value; and
   correction means to correct the image data based on the correction value limited by the limiting means.

2. An information processing apparatus according to claim 1, wherein the printing apparatus can print a predetermined test pattern on the printing medium, and the correction value calculation means calculates the correction value based on read data of the test pattern.

3. An information processing apparatus according to claim 2, wherein a plurality of print areas with different print densities are formed in the test pattern, and
   the correction value calculation means calculates the correction value for each of the print densities based on read data of the plurality of print areas.

4. An information processing apparatus according to claim 1, wherein the predetermined upper limit value and/or the predetermined lower limit value is determined based on a spatial frequency distribution that corresponds to an arrangement of pixels formed on the printing medium by the printing apparatus.

5. An information processing apparatus according to claim 1, wherein the predetermined upper limit value and/or the predetermined lower limit value is determined based on a granularity that corresponds to an arrangement of pixels formed on the printing medium by the printing apparatus.

6. An information processing apparatus according to claim 1, wherein the limiting means changes the limiting range of the correction value according to a gradation level of the image data.

7. An information processing apparatus according to claim 1, wherein the printing apparatus can print the image on the printing medium by using a print head having a plurality of print elements,
   the correction value calculation means calculates the correction value for the image data corresponding to each of the print elements, the limiting means limits the range of the correction value corresponding to each of the print elements, and the correction means corrects the image data corresponding to each of the print elements based on the correction value limited by the limiting means.

8. An information processing apparatus according to claim 1, wherein the printing apparatus can print a predetermined test pattern on the printing medium by forming on the printing medium a raster corresponding to each of a plurality of print elements according to test pattern image data with a predetermined gradation level while moving a print head and the printing medium relative to each other, and the correction value calculation means calculates the correction value based on read data of the test pattern so that a print density of the raster corresponding to each of the plurality of print elements is constant.

9. An information processing apparatus according to claim 1, wherein said limiting means updates the correction value calculated by said correction value calculation means to within the range between the predetermined upper limit value and the predetermined lower limit value, when the correction value calculated by said correction value calculation means is out of the range.

10. A printing apparatus capable of printing an image on a printing medium according to image data, the printing apparatus comprising:

correction value calculation means to calculate a correction value for correcting density variations of the image printed on the printing medium;

limiting means to limit the correction value calculated by said correction value calculation means to within a range limited by a predetermined upper limit value and/or a predetermined lower limit value; and correction means to correct the image data based on the correction value limited by the limiting means.

11. A printing apparatus according to claim 10, wherein the correction value calculation means calculates the correction value based on read data of a test pattern printed on the printing medium.

12. A printing apparatus according to claim 11, wherein a plurality of print areas with different print densities are formed in the test pattern, and the correction value calculation means calculates the correction value for each of the print densities based on read data of the plurality of print areas.

13. A printing apparatus according to claim 11, further comprising means to read the test pattern formed on the printing medium.

14. A printing apparatus according to claim 10, wherein the predetermined upper limit value and/or the predetermined lower limit value is determined based on a spatial frequency distribution that corresponds to an arrangement of pixels formed on the printing medium by the printing apparatus.

15. A printing apparatus according to claim 10, wherein the predetermined upper limit value and/or the predetermined lower limit value is determined based on a granularity that corresponds to an arrangement of pixels formed on the printing medium by the printing apparatus.

16. A printing apparatus according to claim 10, wherein the limiting means changes the limiting range of the correction value according to a gradation level of the image data.

17. A printing apparatus according to claim 10, using a print head having a plurality of print elements to print the image on the printing medium, wherein the correction value calculation means calculates the correction value for the image data corresponding to each of the print elements, the limiting means limits the range of the correction value corresponding to each of the print elements, and the correction means corrects the image data corresponding to each of the print elements based on the correction value limited by the limiting means.

18. A printing apparatus according to claim 17, further comprising:

moving means to move the print head and the printing medium relative to each other; and test pattern printing control means to print a predetermined test pattern on the printing medium by forming on the printing medium a raster corresponding to each of the plurality of print elements based on test pattern image data with a predetermined gradation level, wherein the correction value calculation means calculates the correction value based on read data of the test pattern so that a print density of the raster corresponding to each of the plurality of print elements is constant.

19. A printing apparatus according to claim 17, wherein the print head is an ink jet print head having the plurality of print elements for ejecting ink.

20. A printing apparatus according to claim 19, wherein the print head has electrothermal transducers that generate energy for ejecting ink.

21. A printing apparatus according to claim 10, wherein said limiting means updates the correction value calculated by said correction value calculation means to within the range between the predetermined upper limit value and the predetermined lower limit value, when the correction value calculated by said correction value calculation means is out of the range.

22. An information processing method for correcting image data to be input to a printing apparatus, the printing apparatus being capable of printing an image on a printing medium, the information processing method comprising the steps of:

calculating a correction value for correcting density variations of the image printed on the printing medium;

limiting the correction value calculated in the correction value calculating step to within a range limited by a predetermined upper limit value and/or a predetermined lower limit value; and correcting the image data based on the limited correction value.

23. An information processing method according to claim 22, wherein the correction value calculated in said correction value calculation step is updated to within the range between the predetermined upper limit value and the predetermined lower limit value, when the correction value calculated in said correction value calculation step is out of the range.

24. A method of printing an image on a printing medium based on image data, the method comprising the steps of:

calculating a correction value for correcting density variations of the image printed on the printing medium;

limiting the correction value calculated in the correction value calculation step to within a range limited by a predetermined upper limit value and/or a predetermined lower limit value; and correcting the image data-based on the limited correction value.

25. A method of printing according to claim 24, wherein the correction value calculated in said correction value calculation step is updated to within the range between the predetermined upper limit value and the predetermined lower limit value, when the correction value calculated in said correction value calculation step is out of the range.

* * * * *

UNITED STATES PATENT AND TRADEMARK OFFICE
CERTIFICATE OF CORRECTION

PATENT NO.     : 6,390,583 B1
DATED          : May 21, 2002
INVENTOR(S)    : Kato et al.

It is certified that error appears in the above-identified patent and that said Letters Patent is hereby corrected as shown below:

<u>Title page,</u>
Item [57], ABSTRACT,
Line 11, "made" should read -- make --.
Line 13, "α40" should read -- α' --.

Figure 10:
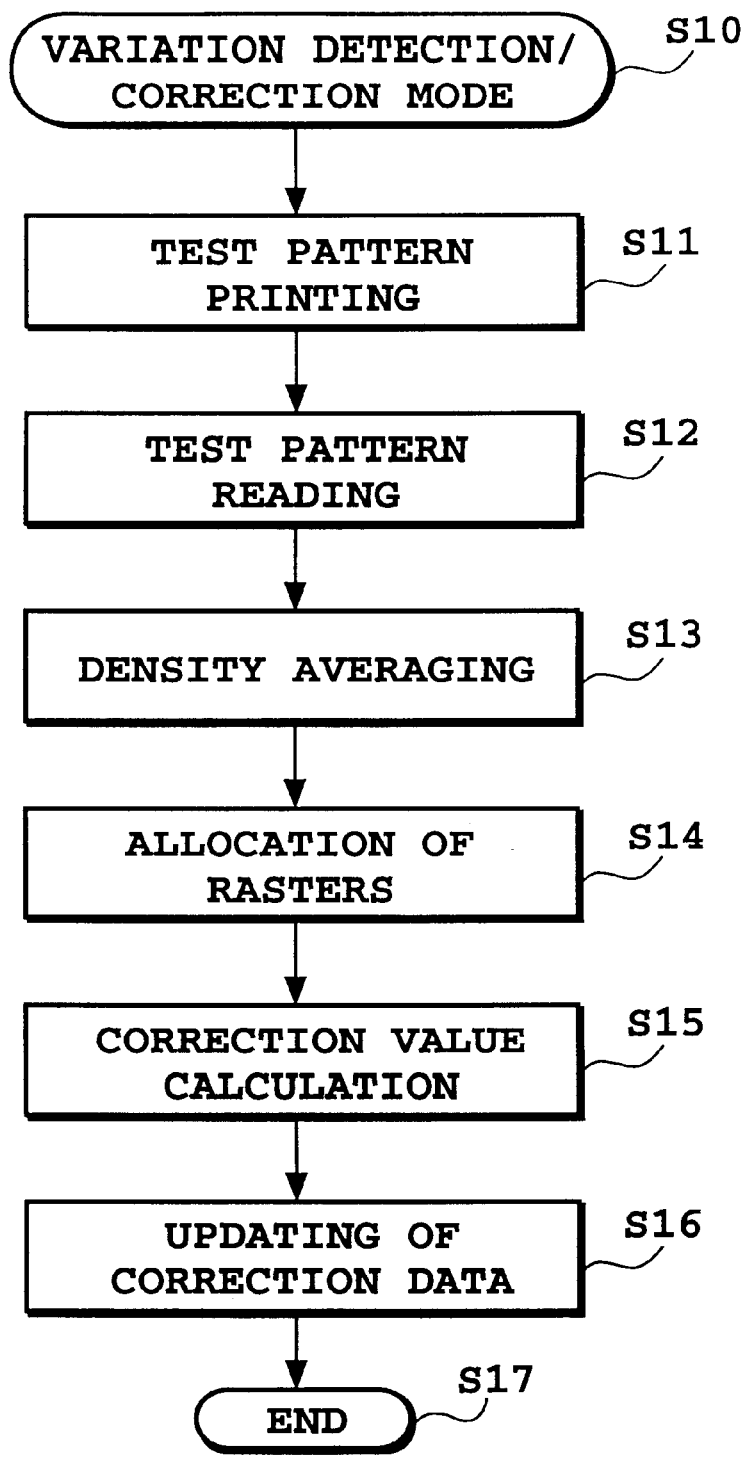
FIG. 10 is a flow chart showing a conventional correction value determination process.
Figure 11:
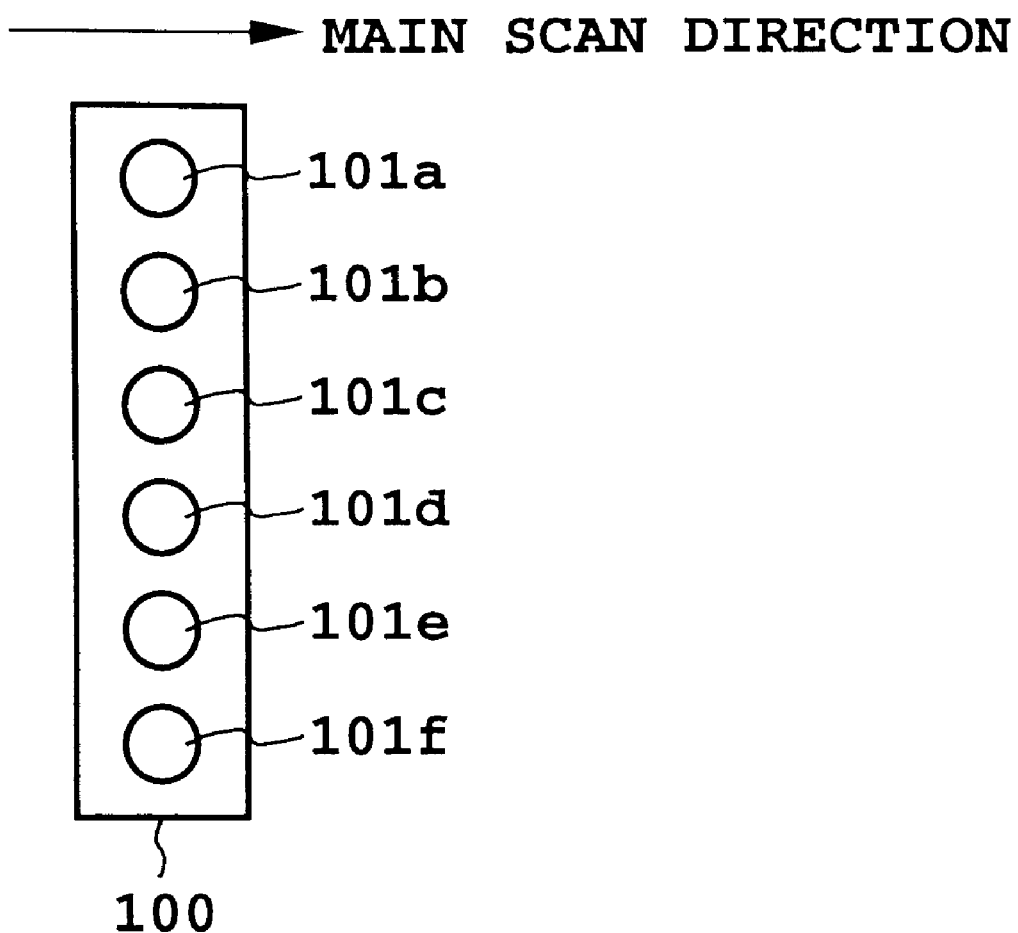
FIG. 11 is a schematic front view of a print head used to explain the conventional correction value determination process.
Figure 12:
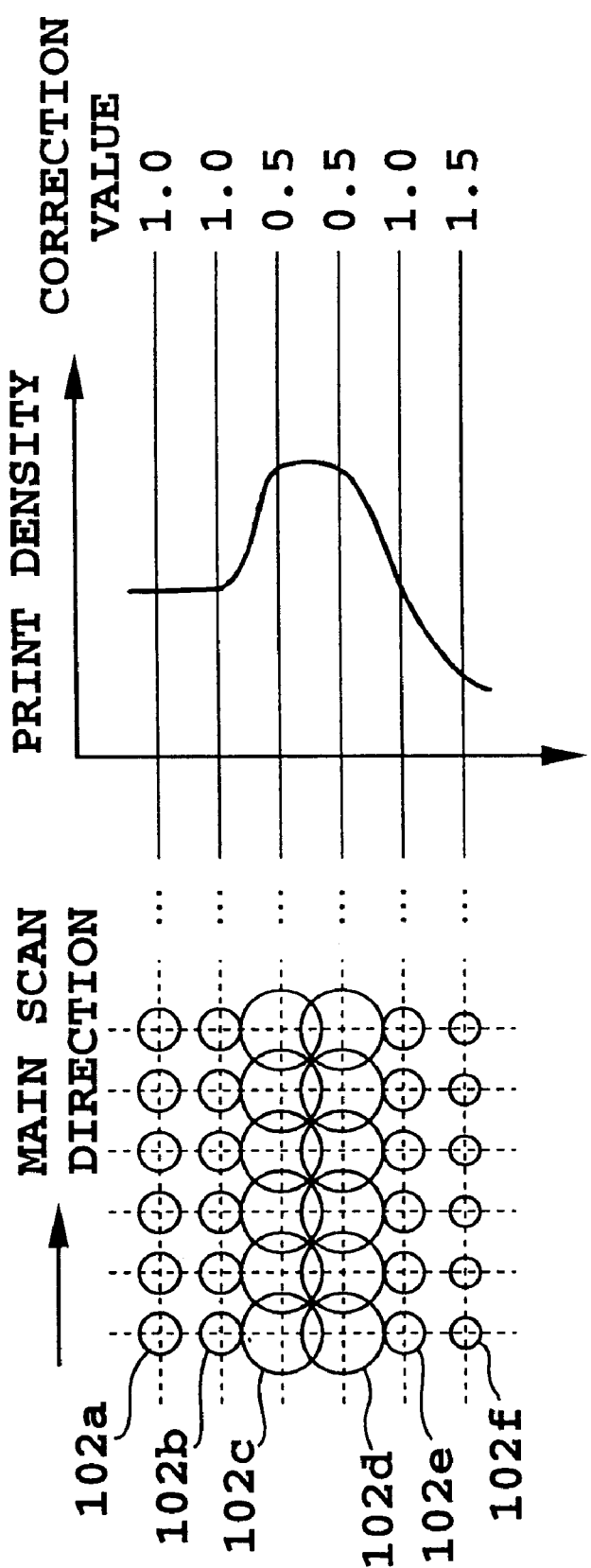
FIG. 12 is a relationship between uncorrected printed dots, uncorrected print densities and correction values, which explains the conventional correction value determination process.
Figure 13:
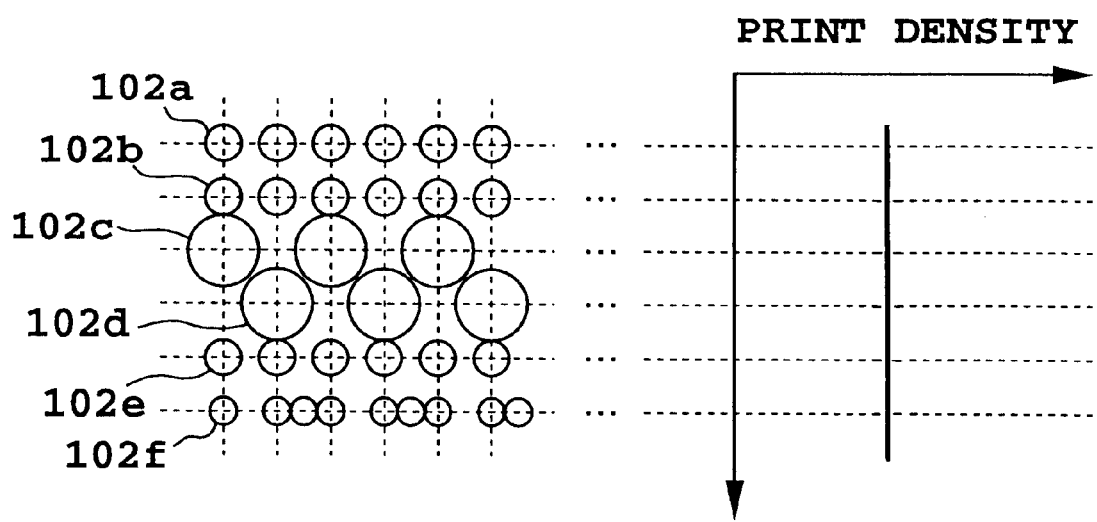
FIG. 13 is a relationship between corrected printed dots and corrected print densities, which explains the conventional correction value determination process.

<u>Column 2,</u>
Line 5, "in" should read -- in Fig. 10. --.
Line 25, "rater," should read -- raster, --.

<u>Column 12,</u>
Line 21, "using-the" should read -- using the --.
Line 65, "the." should read -- the --.

<u>Column 16,</u>
Line 58, "data-based" should read -- data based --.

Signed and Sealed this

Twenty-ninth Day of October, 2002

*Attest:*

*Attesting Officer*

JAMES E. ROGAN
*Director of the United States Patent and Trademark Office*